United States Patent [19]

Mellard

[11] Patent Number: 4,706,408

[45] Date of Patent: Nov. 17, 1987

[54] MARBLES COUNTER WEIGHTED REPEATING MOUSE TRAP

[76] Inventor: George K. Mellard, 43 Pineview Ave. B18, Cardiff, N.J. 08232

[21] Appl. No.: 35,467

[22] Filed: Apr. 7, 1987

[51] Int. Cl.⁴ .................................. A01M 23/04
[52] U.S. Cl. .................................... 43/69
[58] Field of Search ....................... 43/69, 70, 71

[56] References Cited

U.S. PATENT DOCUMENTS

| | | | |
|---|---|---|---|
| 1,466,178 | 8/1923 | Lange | 43/69 |
| 2,056,882 | 10/1936 | Appiani | 43/70 |
| 2,825,995 | 3/1958 | Snider | 43/69 |
| 2,835,070 | 5/1958 | Gomez | 43/69 |

*Primary Examiner*—M. Jordan

*Attorney, Agent, or Firm*—Chenpatents

[57] ABSTRACT

A rodent trap comprises a trough connected to an elongated platform forming an obtuse angle therebetween. Mounting means having a traverse groove is affixed at an apex formed by the trough and the platform. A supporting wire of a wire structure fits into the groove to assemble the trap. The wire structure is clamped on the rim of a bucket, partially filled with water. Marbles are placed in the back end of the trough and the trap is set in a tilt-back position. When a rodent approaches the bait set on the platform, the platform tilts forward and down, triggering the marbles to roll forward to the front end of the trough thereby accelerating the rapid tilting of the platform, thus dropping the rodent off the platform.

16 Claims, 6 Drawing Figures

MARBLES COUNTER WEIGHTED REPEATING MOUSE TRAP

BACKGROUND OF THE INVENTION

1. Field of the Invention

The present invention relates generally to rodent traps and more specifically to traps suitable for trapping mice or rats, said traps having repeating action, not requiring resetting after an animal has been trapped and ensuring that the trapped animal is unable to escape.

2. Description of Prior Art

Many animal traps including rodent traps have been invented. Some of them, such as spring-loaded impalers or jaw-type traps are dangerous to domestic animals and to humans. The disposal of trapped animals from such traps moreover, is a gruesome experience. Other types of traps are excessively elaborate and expensive. Some of them provide electronic sensing devices which, for trapping mice and rats, cannot be economically justified.

U.S. Pat. No. 1,149,774 to J. T. McArdle discloses a mouse trap designed to be placed on a shelf or any horizontal surface above the floor. The trap provides a tilting plateform. The animal's weight on the end of the platform tilts the platform, and the impact of the platform against a bait wire at the rear of the trap restores the platform to its original horizontal position.

U.S. Pat. No. 272,507 to T. B. Zeller discloses a trap having a clip for clamping the trap to the rim of a bucket partially filled with water. A platform is supported on two lugs which pivot on a rod. The platform is designed to be heavier at the rear than the front such that when the animal walks toward the front where the bait is placed, the animal's weight tilts the platform and the animal falls into the bucket.

Another patent, U.S. Pat. No. 1,466,178 to S. Lang, discloses a tilting platform which is hinged at the upper end of an inclined stick. At the rear of the platform, a counterweight is placed at an adjustable distance from the hinge. At the front of the platform, bait is placed at the end of a wire extending from the stick above and to the front of the platform. As the animal approaches the bait, it tips the balance and falls into a bucket placed under the trap.

A common defect in the prior art traps is the fact that a mouse or a rat can step on the platform, be frightened by the gradually increasing motion of the platform, and jump back to safety. Another defect of certain prior art traps is the fact that mice are agile enough to climb up a bait wire, eat the bait, and escape via the bait wire. Therefore, there is a need to provide an improved trap.

The object of this invention is to provide a trap having a platform which tilts very rapidly as soon as a rodent reachers a critical point of imbalance on the platform, so that the animal is unable to escape.

Another object of this invention is to provide a simple and economical trap which is repeatable, without the need for resetting the trap and supplying fresh bait, after a rodent has been trapped.

SUMMARY OF THE INVENTION

The aforementioned objects and advantages of the present invention as well as additional objects and advantages thereof will be more fully understood as a result of the following detailed description of preferred embodiments of the invention taken in conjunction with the accompanying drawings.

The rodent trap in accordance with the present invention comprises a trough connected to a narrow elongated platform at an obtuse angle between said trough and platform, said obtuse angle being 140 to 160 degrees.

The assembly, hereinafter referred to as the trap assembly, is supported at its apex by a horizontal supporting wire which pivotally fits into a groove of a mounting member located at the apex of the trap assembly, allowing the trap assembly to tilt freely. The horizontal supporting wire is a center part of a wire structure, which is clamped to the rim of a bucket or stapled to the edge of a shelf, such that the platform is positioned above the center of the bucket. Into the trough are placed one or more spherical counterweights such as marbles or metal balls, hereinafter referred to as marbles which act as movable weights and which, by rolling in the trough, accelerate the tilting of the platform.

When a rodent climbs along the platform toward its front end where the bait, such as peanut butter, has been smeared into a depression along the lateral edges of the platform, the platform will begin to tilt forward under the weight of the animal. The marbles initially at the rear of the trough, will roll toward the front end of the trough, adjacent to the apex of the trap assembly, unbalancing it and causing it to tilt forward very rapidly. The rodent will thereby be dropped into a bucket partially filled with water.

DESCRIPTION OF PREFERRED EMBODIMENT

Figure 1:
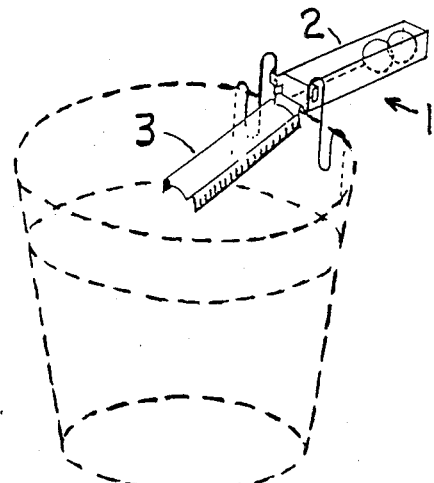
FIG. 1 is an isometric view of the trap clamped to the rim of a bucket partially filled with water.

Referring to FIGS. 1-6, it will be seen that the rodent trap 1 of the present invention comprises a trough 2 connected to a platform 3. The trough 2 and the platform 3 form an obtuse angle between 140 to 160 degrees. At the apex of the obtuse angle, there is provided a mounting member 4 into which fits a wire 13 supporting the trap assembly. The mounting member 4 has on its underside a traverse groove whose profile has the shape of an inverted V or U. Into this traverse groove fits the supporting wire 13. The trap assembly, when mounted on the supporting wire 13 as described, is free to tilt forward and backward within limits as described hereinafter. In a preferred embodiment, the mounting member 4 at the apex between the trough 2 and the platform 3 is an integral part of the trap assembly as shown in the drawings. In another embodiment, the mounting member 4 may be rigidly affixed to the underside of the trough 2 and the platform 3 (not shown), at the apex formed by the trough and the platform, by solding, welding or blazing.

The dimensions of the rodent trap are as follows: The trough is about 4" long by ¾" wide by ¾" high. The mounting member is approximately 1¼" wide and ½" high. The platform 3 is about 1¼' wide and 7-9" long. Along its lateral edges, there are provided raised, down-turned flanges 7 projecting downward about ¾" in height. Two longitudinal depressions 16 may be formed parallel to and between the lateral edges and the raised down-turned flanges. The upper surface 23 of the platform 3 between the longitudinal depressions 16 is slightly convex. Into these depressions, may be smeared sticky bait attractive to rodents, such as peanut butter or cheese spread. The bait may alteratively be smeared directly onto the tip of the platform.

The wire structure 8 has two sets of 180 degree return bends, 9 and 10, being the upper return bends, and 11 and 12, being the lower return bends. The wire structure 8 preferably is made by bending 10 to 12 gauge wire into said predetermined shape. The supporting wire 13 is a mid-portion of the wire structure 8 and the length of the supporting wire 13 is slightly greater than the width of the mounting member 4.

The assembly of the rodent trap of the present invention is explained by reference to FIGS. 1 and 2. The wire structure 8 is resiliently clamped onto the rim of a bucket in such manner that the lower return bends 11 and 12 come to rest on the rim of the bucket. The trap assembly 1 is then mounted onto the wire structure 8 in such manner that the mounting member 4 rides on the horizontal supporting wire 13 of the wire structure 8 between the upper return bends 9 and 10, and that the platform 3 is above the center of the bucket. A wooden stick with a wire clip attached thereto may be propped up next to the trap, with the top of the stick clipped to the rim of the bucket and the lower end of the stick resting on the floor or ground. This enables the rodent to climb to the rim of the bucket. The stick forms no part of the present invention and is not illustrated in the drawings.

After the rodent trap has been assembled as described, the trap assembly is set in its normal tilted-back position with the trough dipping down slightly from the horizontal, and with the marbles 6 in the trough resting at the back end of the trough farthest removed from the apex of the trap assembly. In this position, the platform dips downward about 20 to 40 degrees from the horizontal. When the trap assembly has fully tilted forward, the trough points up about 45 degrees from the horizontal and the marbles in the trough have rolled to the front of the trough next to the apex of the trap assembly. The platform will dip down about 65 to 85 degrees from the horizontal, as shown by the solid line in FIG. 3.

Figure 2:
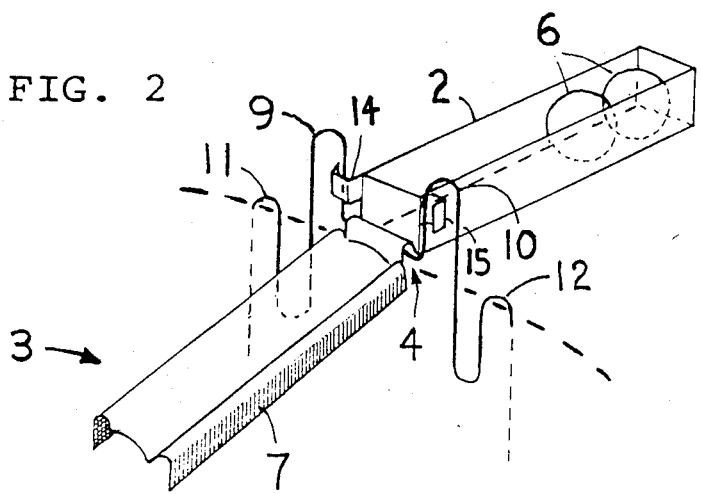
FIG. 2 is an isometric view of the trap showing its elements in greater detail.
Figure 3:
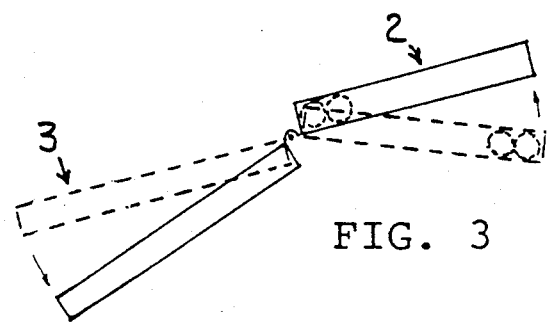
FIG. 3 is a side view of the trap tilted forward from the preset tilted back position.
Figure 6:
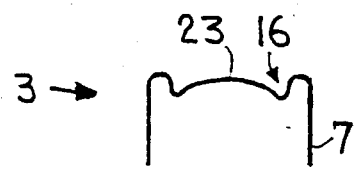
FIG. 6 is an end view of the platform of the trap of this invention.
Figure 5:
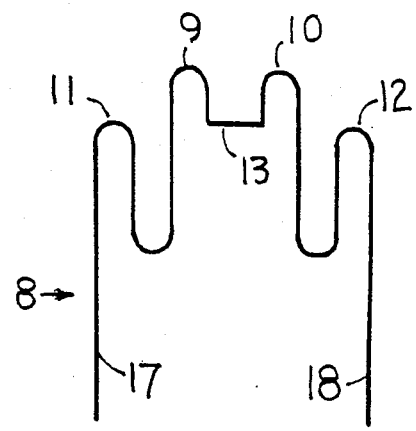
FIG. 5 illustrates the wire structure for supporting the trap assembly of this invention.

It should be appreciated that in order to maintain the repeating action of the trap, the trap is set such that tab 14 is placed in front of return bend 9 and tab 15 is placed at the back of return bend 10 as shown in FIG. 2. The tilting of the trap assembly, when mounted on the wire structure 8, is limited by two tabs, 14 and 15, as best shown in FIG. 2. Tab 14 extending from one side of the front end of the trough, forwardly thereof, in the form of an elbow or U, is placed in front of return bend 9 and thus limits the backward tilting of the trap assembly by coming to rest against the return bend 9 when the trap has fully tilted backward. Tab 15 extending from the opposite side of the front end of the trough, in the form of an inverted U, is placed behind the return bend 10, and thus limits the forward tilting of the trap assembly by coming to rest against the return bend 10 when the trap assembly has fully tilted forward.

As designed, the trap will entice rodents, such as mice or rats to explore the platform and attempt to get at the bait. As the animal moves towards the front end of the platform, it reaches a point at which its weight tips the balance of the trap assembly, triggering the marbles in the trough to roll towards the front end of the trough, thereby accelerating the forward tilting of the platform and dropping the animal into the bucket. As soon as the animal has dropped off the end or the side of the platform, the platform reaches its forward tilting limit (tab 15 resting on return bend 10), and the weight of the trough tilts the trap assembly back with the marbles rolling back to the back end of the trough, and thus hasten the trap assembly to tilt to its normal tilt-back limit (tab 14 resting on return bend 9).

It is apparent that the bait need not be replaced each time that an animal has been trapped, since not all of the smeared-on bait will be consumed.

It is also to be noted that the round, raised, down-turned flanges on the lateral sides of the platform are too smooth for the animal to be able to grip firmly, thus making its escape impossible.

The trap assembly may be formed by cutting or stamping out an appropriately shaped piece of thin sheet metal, 20 to 24 gauge, and bending it into its predetermined shape. Alternatively, the trap assembly may be made of plastic and formed by injection molding.

The trough is preferably covered over and its back end is provided with a back door for insertion of the marbles. In an alternative embodiment, the trough may be made of metal or plastic pipe, with the inside diameter of the pipe slightly greater than the diameter of the marbles. The interior of either of the troughs may be lined with cloth or plastic foil so as to minimize the noise of the marbles rolling in the trough, as such noise may potentially frighten the animal to hurriedly run back up the platform.

A counterweight in the form of a metal washer or other similar small object may be fastened to the back end of the trough by being placed over a pin projecting upward at the back end of the trough. The counterweight may alternatively be inserted into a slot at the back end of the trough.

Figure 4:
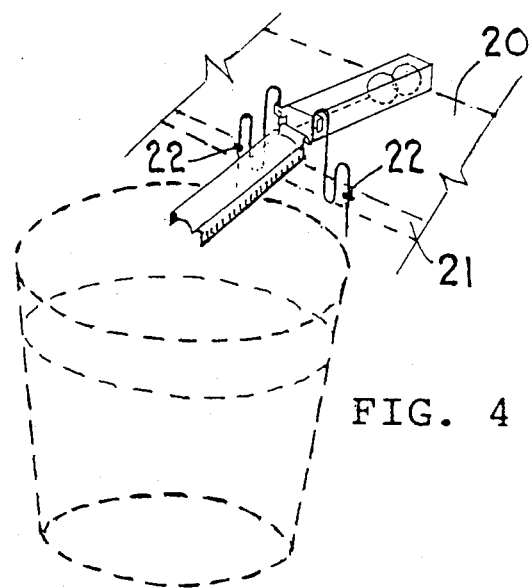
FIG. 4 illustrates an alternative mode of operation of the invention in which trap is stapled to the edge of a shelf and a bucket partially filled with water is placed underneath it.

In an alternative mode of operation of the rodent trap in accordance with the present invention, the trap is fastened to the side 21 of a shelf 20 by staples 22 as illustrated in FIG. 4. The wire structure 8 is stapled at its ends, 17 and 18 such that the return bends 9 and 10 are somewhat above the shelf surface and the trap assembly, when mounted on the wire structure 8 as explained hereinabove, is at an elevation such that the back end of the trough rests on the surface of the shelf. The trough thus assists the animal in climbing onto the platform towards the bait. The bucket partially filled with water is placed under the trap in such a position that, with the trap assembly titlted forward, the front end of platform points approximately to the center of the bucket.

The bucket used in either operation mode should be about 16" high and at least 12" in diameter; and the water should be at least 4" deep in the bucket. The distance from the water surface to the front end of the platform, with the trap assembly in its set tilt-back position, should be no less than 6".

The number of marbles placed in the trough depends on the expected weight of the rodents to be trapped.

For rats, because of their heavier weight, more or heavier marbles or addition counterweights may be required.

When rats or other large rodents such as ground hogs or gophers, are to be trapped, the trap assembly dimensions including its supporting wire structure must be increased as needed. For animals other than rats or mice, greens or grains in a sack rather than peanut butter are used as bait. In thes latter case, the front end of the platform is bent downward and back onto its underside to form a clamp so as to hold the greens.

Numerous modifications and variations of the present invention are possible in light of the above teachings and therefore, within the scope of the appended claims. The invention may be practiced otherwise than as particularly described.

I claim:

1. A rodent trap comprising:
   a trough having a front and a back end for holding marbles; an elongated platform connected to the front end of the trough at an obtuse angle; a wire structure having a supporting wire; mounting means affixed adjacent to an apex formed by the trough and the platform, removably and pivotally mounted on said supporting wire; said marbles being initially disposed at the back end of the trough, thus tilting the trough backward and said marbles being actuated by the weight of the rodent on the platform to roll forward to the front end of the trough, thereby accelerating the platform to rapidly tilt forward and down.

2. A rodent trap of claim 1, wherein the mounting means has a transverse groove and said mounting means is integrally connected to the trough and plaform at the apex.

3. A rodent trap of claim 1, wherein the mounting means is affixed under the trough and platform at the apex.

4. A rodent trap of claim 1, wherein the wire structure has two sets of 180 degree return bends, a first set of the return bends being adjacent to the supporting wire and a second set of the return bends, lower than the first set, being provided for attachment of the trap to a rim of a bucket.

5. A rodent trap of claim 1, wherein the elongated platform has lateral raised, round, down-turned flanges at its lateral sides.

6. A rodent trap of claim 5, further comprising longitudinal depressions formed between the lateral sides and said raised, round down-turned flanges.

7. A rodent trap of claim 5, wherein an upper surface of the platform is convex.

8. A rodent trap of claim 1, wherein the obtuse angle is between 140 to 160 degrees.

9. A rodent trap of claim 4, further comprising:
   tabs projecting outwardly from either side of the front end of the trough, a first tab extending forward of one of the first set return bends, for limiting the backward tilting of the trap and a second tab extending backward of the opposite return bend of the first set, for limiting the forward tilting of the trap.

10. A rodent trap of claim 1, wherein the trough is covered.

11. A rodent trap of claim 10, wherein the covered trough is a pipe.

12. A rodent trap of claim 10 wherein the interior of the trough is lined with cloth.

13. A rodent trap of claim 9, wherein the front end of the platform is provided with a clamp for holding greens.

14. A rodent trap comprising:
   a trough having a front and back end for holding marbles; an elongated platform connected to the front end of the trough at an obtuse angle;
   a wire structure having a supporting wire;
   mounting means affixed adjacent to an apex formed by the trough and the platform, removably and pivotally mounted on said supporting wire;
   said wire structure having two sets of 180 degree return bends, a first set return bends being adjacent to the supporting wire, and a second set of return bends lower than the first set, for attachment of the trap to a rim of a bucket; tabs projecting from either side of the front end of the trough, a first tab extending forward of one of the first return bends, for limiting backward tilting of the trap; a second tab extending backward of the opposite return bend of the first set, for limiting the forward tilting of the trap; and
   said marbles being rolled from back end of the trough to the front by the weight of the rodent on the platform, thereby rapidly tilting the platform down.

15. A rodent trap of claim 14, wherein the second set of return bends is to ride on the rim of a bucket partially filled with water.

16. A rodent trap of claim 14, wherein the second set of return bends is to be stapled to a side of a shelf.

* * * * *